Nov. 18, 1958   R. E. ADLER   2,861,171
APPARATUS FOR THE PREPARATION OF HOT BEVERAGES
Filed June 6, 1956
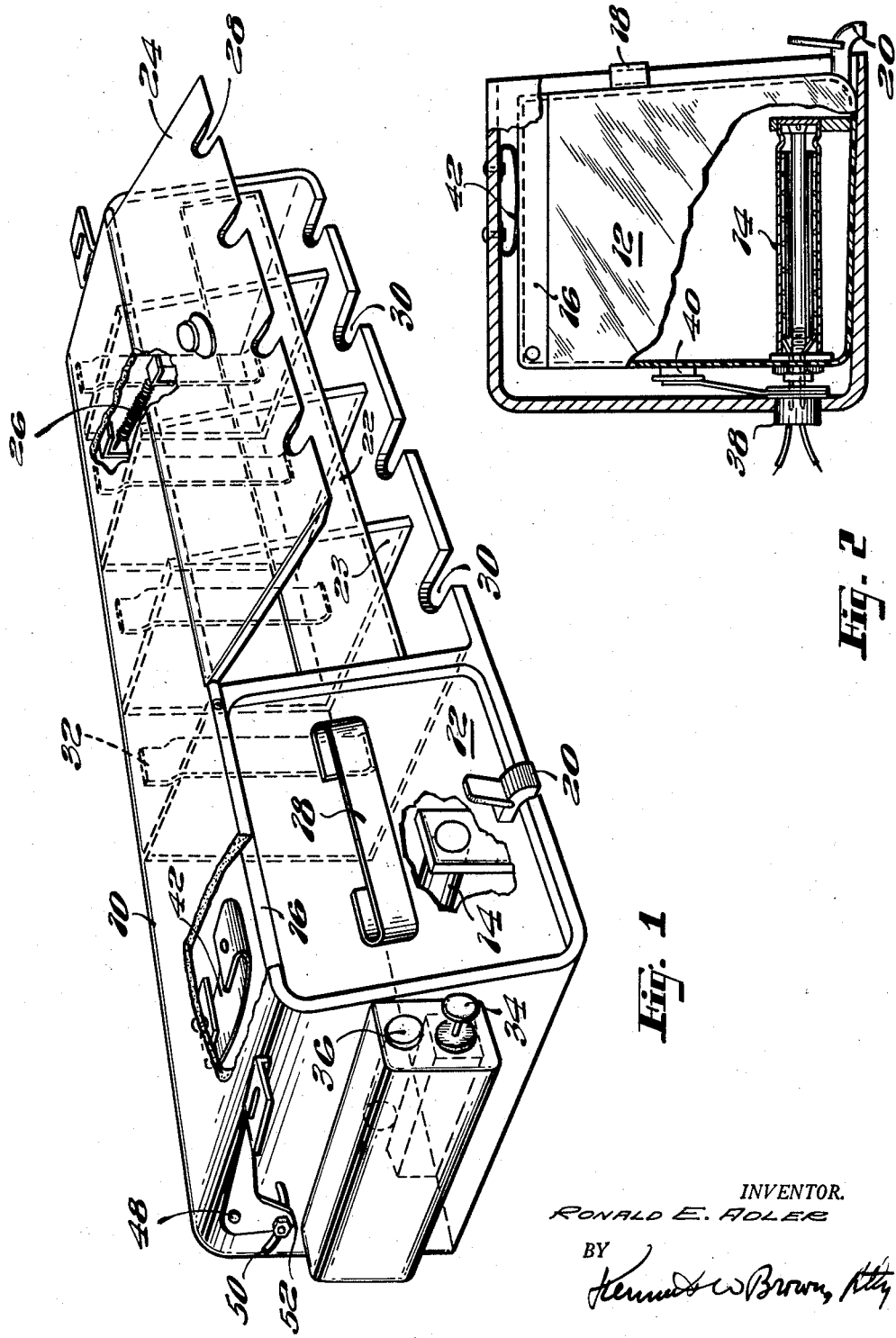
INVENTOR.
RONALD E. ADLER
BY

United States Patent Office 2,861,171
Patented Nov. 18, 1958

2,861,171

APPARATUS FOR THE PREPARATION OF HOT BEVERAGES

Ronald E. Adler, Highland Park, Ill.

Application June 6, 1956, Serial No. 589,655

3 Claims. (Cl. 219—43)

This invention relates to a unitary device for the preparation of hot beverages. More specifically, it is directed to a self-contained device for preparing hot beverages in which powdered ingredients are added to heated water. It is particularly suitable for attachment beneath the dashboard of automobiles but may also be portable for home and office use.

There has long been a need for a completely integrated device for preparing hot drinks which may be placed in any convenient location such as on a desk or table or which is capable of easy attachment to automobiles in a location which is readily accessible yet which does not interfere with the comfort and safety of the occupants thereof. The need has been fulfilled by the apparatus of my invention which comprises an elongated casing or cabinet equipped with suitable supporting and/or carrying means. The cabinet includes a compartment provided with electrical contacts to accommodate a canister adapted to contain liquid which canister is equipped with a heating element and mating electrical connectors. Additionally, a plurality of narrow chambers are provided for the storage in envelopes of the powdered ingredients required for the beverage. Such ingredients include powdered coffee, tea, cocoa, etc., sugar and powdered cream. A spring loaded door encloses the open front end of the powdered ingredient container section and access notches are likewise provided for easy removal of such materials.

It is the principal object of this invention to provide a novel beverage brewer having provision for the preparation of hot water and storage of powdered ingredients, all in a compact and unitary enclosure and conveniently arranged for ready access.

It is also an object to provide such a device which in one embodiment is adapted for quick and easy attachment beneath the dashboard of an automobile in such manner that it will not interfere with the comfort of the occupants of the automobile yet will still be fully accessible.

It is another object of this invention to provide such a device which in another embodiment can be placed on a table, desk or the like and is ornamental as well as useful.

My invention will be more clearly understood from the following description thereof taken in connection with the accompanying drawings in which Fig. 1 is a perspective view of the apparatus partly in cross section and Fig. 2 is a sectional side view of the canister compartment with the canister in position therein.

The apparatus comprises a cabinet 10 divided into a series of compartments. The largest of these is adapted to contain a removable canister 12 provided with a heating element 14, a hinged lid 16, a handle 18 and a spout 20. This canister may be constructed of metal or of a plastic such as melamine. Plastic construction is preferred since it has low thermal and electrical conductivity whereas a metal must be separately insulated. A plurality of narrower compartments 23 are likewise provided for the storage of packaged powders which are held in place in the compartments by means of retaining strip 22 situated above floor level by the amount of thickness of two packages or so and hinged door 24 biased in the closed position by a spring 26. Both the door 24 and the floor of the compartments 23 are provided with access notches 28 and 30, respectively, whereby the packages may readily be gripped by the fingers. Adjustable guide leaves 32 may be attached as required to the back walls of compartments 23 to accommodate different sizes of packages and insure snug fit. A manual switch 34 is attached to the wall of the cabinet 10 to energize the heating element 14. Advantageously a signal light 36 is included to indicate electric current flow.

The canister compartment, shown in detail in Fig. 2, is equipped at the back with socket 38 and thermostatic switch 40 and under its top with canister retaining spring 42. Socket 38 is connected to a source of electricity, which may be the electric power system of the automobile or the usual house electric supply. Thermostatic switch 40 is connected into the power supply in series with manual switch 34 and is arranged to break the circuit when a predetermined temperature is reached in the canister. This switch may be of any suitable type and advantageously is of the bimetallic type.

Heating element 14 is placed at any convenient location within canister 12 and its terminals extend through a liquid tight seal in the back of the canister to contacts 44 adapted to mate with those in socket 38. Thus, when the canister is pushed into its compartment its contacts 44 automatically engage the terminals in socket 38 and complete the electrical connection.

The spring 42 in the top of the compartment is provided to hold the canister in place and also to maintain the top 16 firmly seated against a suitable gasket to prevent splashing of the liquid while the cabinet is in motion. The spring also serves as a safety valve should the contacts of the canister become overheated by reason of failure of the thermostatic switch or otherwise, the vapors being permitted to escape as their pressure against the top will urge it upward against the spring force.

The embodiment of the apparatus shown in Fig. 1 is primarily adapted for mounting beneath the dashboard of an automobile. For this purpose a bracket 46 is provided at each end of the cabinet which bracket is pivoted at 48 to allow for rotational adjustment. Since the ledges beneath the dashboards are not of the same configuration in different makes of automobiles it is necessary to make provision for adjustment between bracket and cabinet in some such manner as is shown. Thus, sector 50 may be attached to the cabinet and a lock screw 52 arranged to grip the sector in the selected position when the cabinet is appropriately levelled.

It will be appreciated that other means may be provided for supporting the apparatus of this invention suitable to the environment in which the apparatus is used. Thus for desk or table use the cabinet will be equipped with legs and will advantageously have a handle on its top for carrying purposes. Also the canister 12 may have a spout located elsewhere, for example, in the sidewall near the top, so that when the cabinet 10 is kept on a table the canister can be handled as a kettle and tilted for pouring. However, when mounted in an automobile a valved spigot as illustrated is preferably employed to make removal of the canister from its compartment unnecessary.

Other modifications can be made within the scope of this invention. For instance, spring hinges of conventional type may be provided in place of tension spring 26. Likewise, the floor of any or all of compartments 22 may be sloped upwardly toward the front to retain the packed powders within the compartment although I prefer to provide retaining strip 23 for the purpose. Still other alternatives will occur to those skilled in the art.

Apparatus constructed according to this invention had the following dimensions:

|  | Inches |
|---|---|
| Length | 15 |
| Height | 3½ |
| Depth | 5 |

To prepare a hot beverage by means of the apparatus of my invention the following procedure is followed. The canister 12 is filled with water and firmly seated in its compartment with its electrical contacts firmly plugged in. Switch 34 is turned on to deliver current to heating element 14 and illuminate pilot light 36. When the water reaches the selected temperature current is shut off by thermostatic switch 40 and the pilot light is extinguished. The packages of powdered ingredients may then be withdrawn by gripping their edges with the fingers inserted in the access notches and their contents are emptied into a cup. Hot water is drawn from the canister into the cup and the drink is ready for consumption.

Having thus described my invention, I claim:

1. Apparatus for the provision of hot beverages comprising, in combination, an elongated cabinet divided into a series of compartments, a fluids canister removably positioned in one of said compartments, others of said compartments being arranged for dispensing packaged solids, used in preparing hot beverages, an electric heating element for heating the fluid in said fluids canister, a lid on said fluids canister, and means for resiliently retaining said lid on said canister when the latter is in place in its compartment in the cabinet thereby preventing spilling of fluid from the canister.

2. The apparatus of claim 1 wherein means is provided on said canister to permit removal of the fluid therein while said canister is in place in its compartment.

3. Apparatus for the provision of hot beverages comprising in combination an elongated cabinet divided into a series of compartments, a fluids canister removably carried in one of said compartments, the other compartments for dispensing packaged solids used in preparing hot beverages, an electric heating element for heating the fluid in said fluids canister, a lid seated on said fluids canister, spring means carried on said cabinet for resiliently urging said lid into seating relationship on said canister and for removably retaining said canister in place in its compartment, and a spout provided on said canister for permitting removal of the fluid from the canister while the latter is in place in its compartment.

References Cited in the file of this patent

UNITED STATES PATENTS

| 1,379,228 | Swift | May 24, 1921 |
| 1,896,430 | Stanawitz | Feb. 7, 1933 |
| 2,134,865 | Essery | Nov. 1, 1938 |
| 2,293,764 | Roeder | Aug. 25, 1942 |
| 2,311,855 | Nelson | Feb. 23, 1943 |
| 2,515,514 | Jones | July 18, 1950 |
| 2,585,310 | Gronlund | Feb. 12, 1952 |
| 2,640,140 | Stiebel | May 26, 1953 |
| 2,661,015 | Allred | Dec. 1, 1953 |

FOREIGN PATENTS

| 609,916 | Great Britain | Oct. 8, 1948 |